United States Patent [19]

Grawey

[11] 4,125,930
[45] Nov. 21, 1978

[54] METHOD FOR MOUNTING A CLOSED TOROUS TIRE ON A RIM

[75] Inventor: Charles E. Grawey, Peoria, Ill.

[73] Assignee: Caterpillar Tractor Co., Peoria, Ill.

[21] Appl. No.: 815,111

[22] Filed: Jul. 13, 1977

[51] Int. Cl.² ............................................. B23P 11/02
[52] U.S. Cl. ..................................... 29/450; 157/1.17
[58] Field of Search .................. 29/159.01, 159.1, 449, 29/450, 451, 512; 152/330 R, 375, 378 R; 157/1.17, 1.2, 1.22, 1.28

[56] References Cited

U.S. PATENT DOCUMENTS

| 1,266,844 | 5/1918 | Moore | 29/159.01 |
| 3,029,860 | 4/1962 | Schultz et al. | 157/1.22 |
| 3,470,933 | 10/1969 | Molnar | 152/330 |

*Primary Examiner*—Michael J. Keenan
*Attorney, Agent, or Firm*—John W. Grant

[57] ABSTRACT

A method for mounting a closed torous tire on a rim by withdrawing a volume of air from the tire, thereafter positioning the tire on the rim, and passing a volume of fluid into the tire.

8 Claims, 5 Drawing Figures

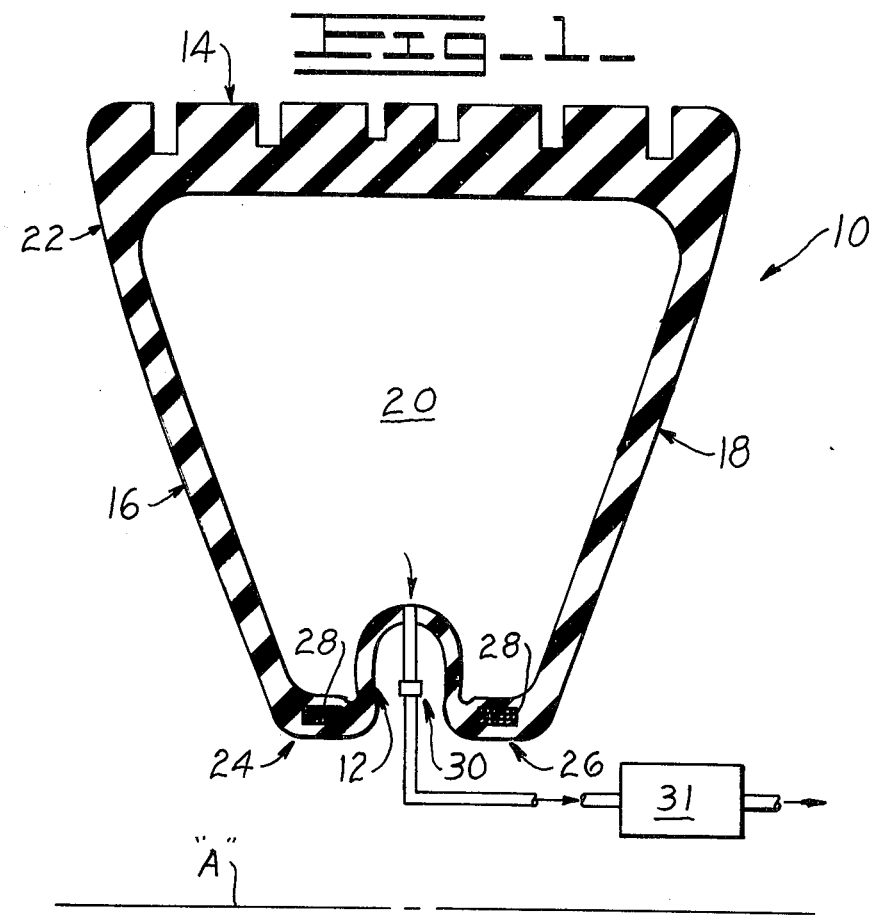
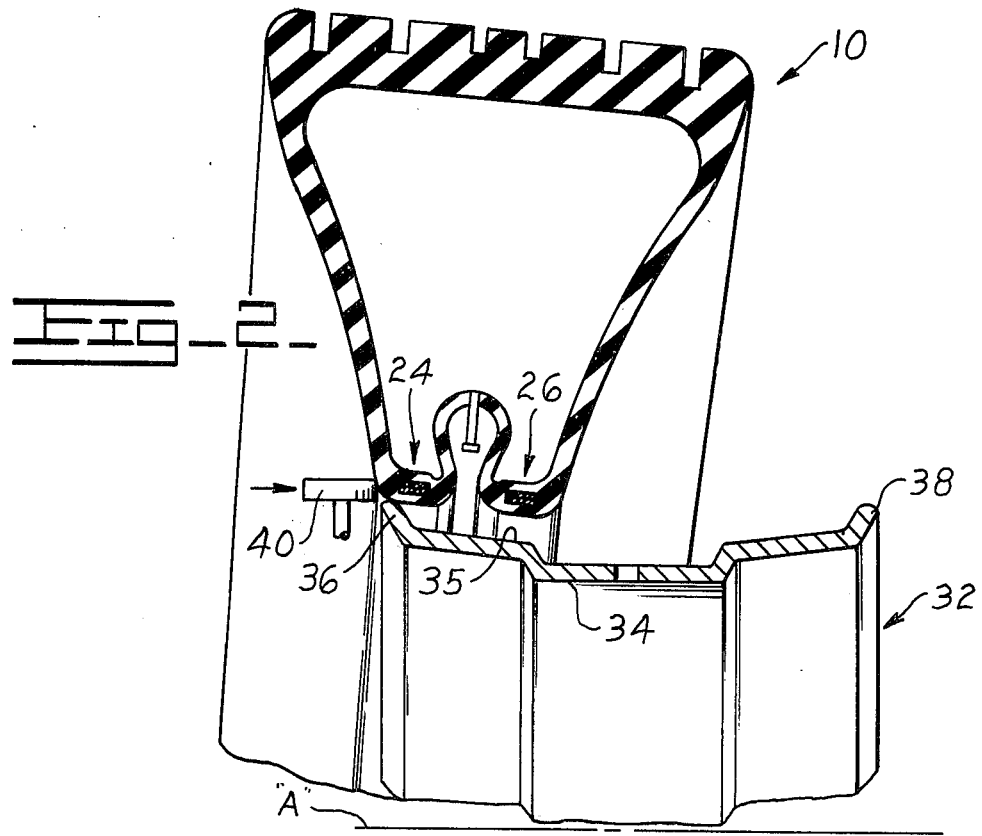

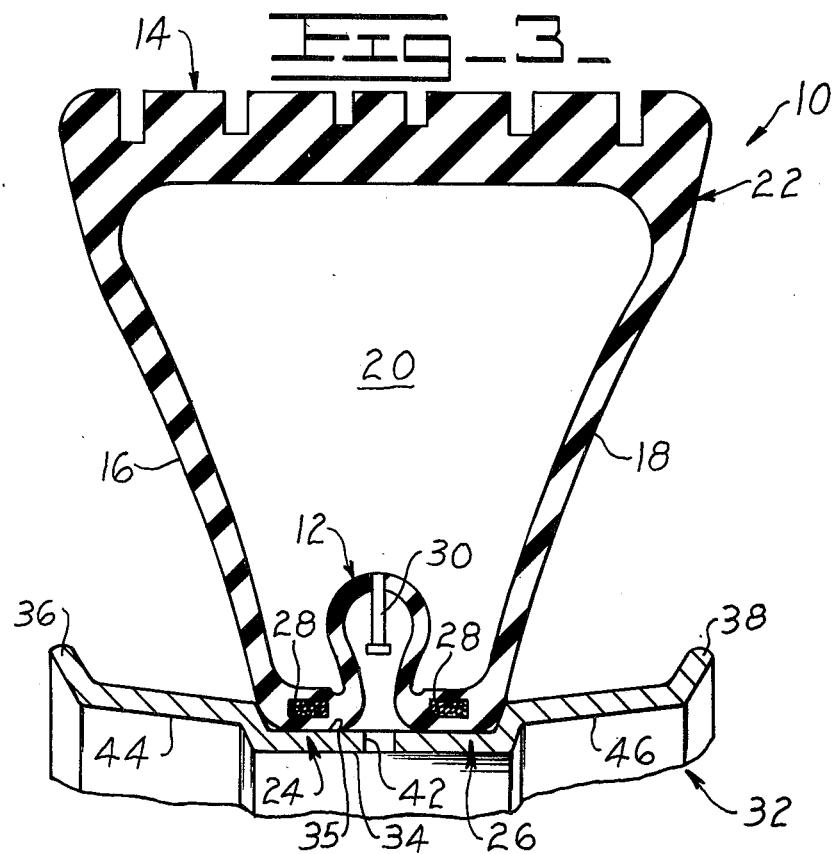
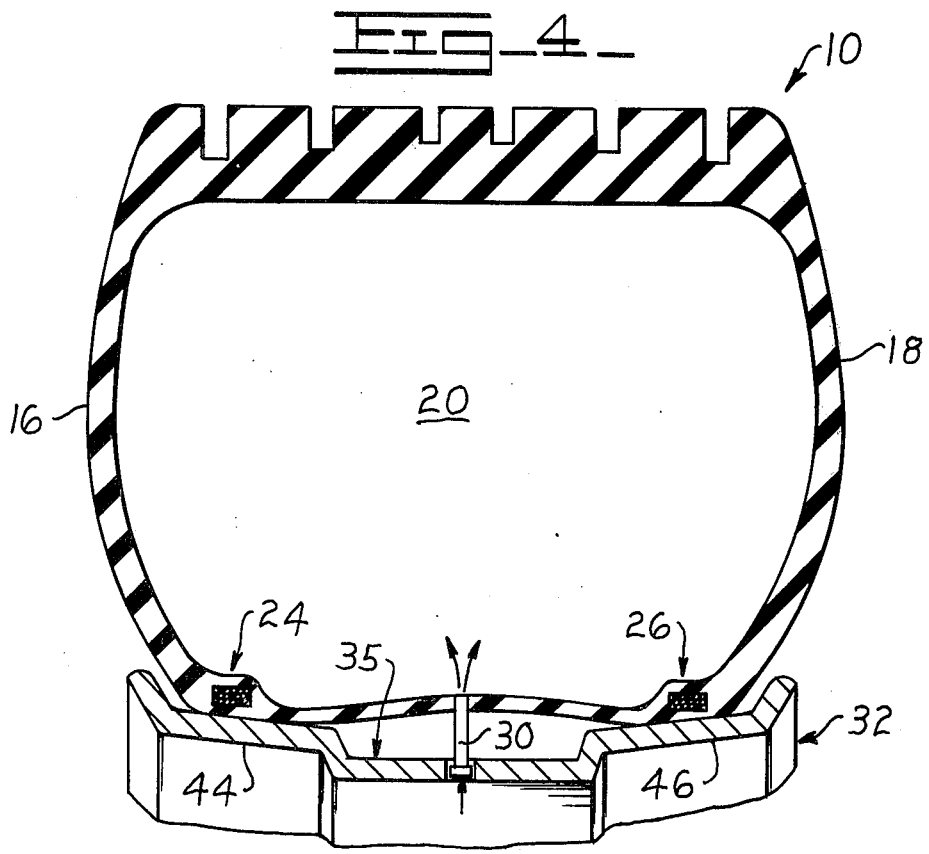

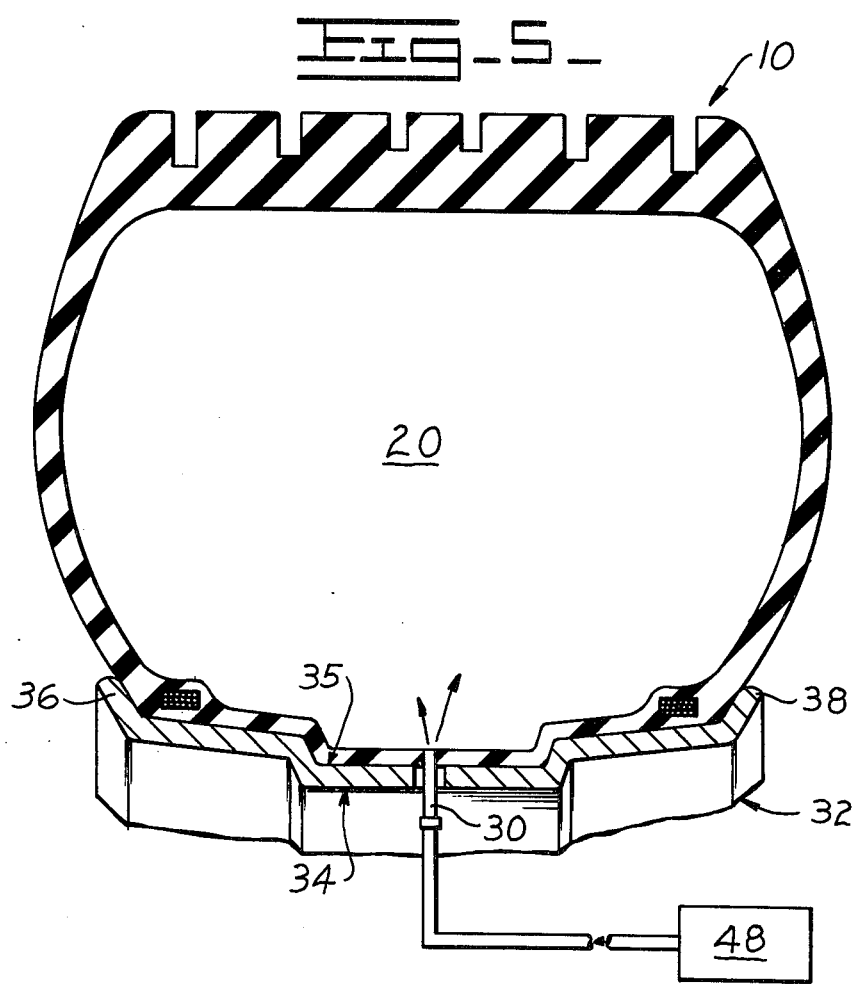

METHOD FOR MOUNTING A CLOSED TOROUS TIRE ON A RIM

BACKGROUND OF THE INVENTION

Closed torous tires are well known in the art. These heretofore known tires were generally restricted to use on split type rims owing to the fact that the rim walls of the tire would often be damaged by tools utilized for prying the tire over outer flanges of a drop center rim. As is further known in the art, drop center rims are of unitary construction and therefore have increased strength, durability, are easier to manufacture, and therefore are more desirable for use with a closed torous tire.

SUMMARY OF THE INVENTION

The present invention is directed to overcoming one or more of the problems as set forth above.

According to the present invention, a closed torous tire is mounted on a rim by withdrawing a volume of air from the tire sufficient to move the roll hoops of the tire to locations adjacent one another, thereafter positioning the tire on the rim and passing a volume of fluid into the tire for inflating the tire to a preselected pressure and seating the tire on the rim.

BRIEF DESCRIPTION OF THE DRAWINGS

FIG. 1 is a diagrammatic sectional view of a closed torous tire having air being removed therefrom;

FIG. 2 is a diagrammatic sectional view of a closed torous tire being positioned on a drop center rim, for example;

FIG. 3 is a diagrammatic sectional view of the tire positioned on the rim;

FIG. 4 is a diagrammatic sectional view of air passing into the tire for moving portions of the tire relative to the rim; and FIG. 5 is a diagrammatic sectional view of fluid passing into the tire for moving portions of the tire into seating engagement with the rim.

DETAILED DESCRIPTION

Referring to FIG. 1, a closed torous tire 10 has a rim wall 12, a tread wall 14, and opposed side walls 16, 18 connecting the rim wall 12 to the tread wall 14 and defining an annular inner chamber 20 and an outer surface 22, as is well known in the art.

First and second roll hoop areas 24, 26 each generally define the juncture between a respective side wall 16, 18 and the rim wall 12. These roll hoop areas 24, 26 are generally reinforced with cord, cable, or other reinforcing materials 28. A valve assembly 30 extends from the outer surface 22 into communication with the chamber 20 for passing fluid into and from the chamber 20. Preferably, the valve assembly 30 extends through the rim wall 12 of the tire 10, but can extend through other portions of the tire 10 without departing from this invention.

The tire 10 is mounted on a rim, for example a drop center rim 32, as hereinafter more fully described and shown in FIGS. 2–5. The drop center rim 32 is well known in the art and is or unitary construction or formed of a plurality of pieces fixedly connected by welding for example. It should be understood, however, that the method of this invention can be practiced on any type of rim for protecting the tire rim wall from damage during mounting operations.

In the method of mounting the tire 10 on the rim 32, fluid or air is withdrawn from the tire chamber 20 through the valve assembly 30 by a vacuum pump 31, for example. The volume of air withdrawn is of a magnitude sufficient for moving the opposed roll hoop areas 24, 26 to locations adjacent one another in response to atmospheric pressure acting on the tire outer surface 22 and reducing the pressure within the chamber 20 to a lower magnitude than said atmospheric pressure. The rim wall 12 is moved into the tire chamber 20 in response to reducing the pressure within the chamber 20 and moving of the roll hoop areas 24, 26 toward one another.

Referring to FIG. 2, after passing air from the tire, the valve assembly 30 is closed and the tire 10 is positioned on the rim 32 with the pair of roll hoop areas 24, 26 positioned adjacent a tire seat 35 here located between rim flanges 36, 38. This positioning of the tire on the rim 32 adjacent the tire seat 35 is preferably accomplished by progressively urging one and then the other roll hoop area portions over a selected rim flange 36 until all roll hoop areas 24, 26 are positioned between the rim flanges 36, 38, as shown in FIG. 3.

Preferably, this is accomplished by individually and progressively urging each roll hoop portion over the flange 36 by applying forces generally parallel to the tire axis "A" as shown in FIG. 2. It should be understood, however, that tools of other construction than roller 40 can be utilized and the tire can be positioned adjacent a seat 35 on rims having no flanges 36, 38 without departing from this invention.

Referring to FIG. 4, the valve assembly 30 is thereafter opened and fluid is passed through the valve assembly 30 and into the tire chamber 20. The volume of fluid passed into the chamber 20 is a volume sufficient for inflating the tire 10 to a preselected pressure and seating the tire on the tire seat 35 of the rim 32 where the rim 32 is a drop center rim, annular portions of the tire 10 are moved into forcible contact with the flanges 36, 38.

In the embodiment shown in FIG. 4, opening of the valve assembly 30 passes air into the chamber 20 and the increased pressure within the chamber causes rim wall 12 to move toward the rim well 34 with a portion of the valve assembly 30 passing through an opening 42 of the tire seating surface 35 or rim well 34. As the rim wall 12 moves, the roll hoop areas also slide along the tire seating surface 35 outwardly over intermediate flanges 44, 46 of the rim 32 toward respective outer rim flanges 36, 38.

During initial reinflation operations, it should be understood that the operator should carefully position the valve assembly 30 adjacent the opening 42 prior to passing any fluid into the chamber 20 in order to avoid unnecessary labor and possible damage to the valve assembly 30.

Fluid can thereafter be passed into the chamber 20 for inflating the tire to a preselected pressure for positioning the tire at a preselected position on the rim seating surface 35, for example 80 psi. Thereafter, the pressure can be lowered to a preselected operating pressure, for example 45 psi.

The passing of fluid is preferably accomplished in first and second stages. Air is first passed into the chamber in response to opening the valve assembly 30 (FIG. 4) and thereafter fluid is forced into the chamber 20 by pressure means 48 (FIG. 5).

The fluid forced into the chamber 20 by pressure means 48 can be air or some different fluid such as preferably nitrogen. The pressure means can be a pump or a pressurized reservoir and the particular type may depend upon the fluid selected.

It should be understood that the fluid passed into the rim mounted tire 10 can be solely a fluid other than air be eliminating the first stage of passing fluid into the tire. Further, depending upon the construction of the tire, the roll hoop areas 24, 26 will slide over the intermediate flanges 44, 46 in response to removal of the vacuum within the chamber and/or the pressurizing of the chamber above atmospheric.

It should be understood that the amount of air or fluid withdrawn from the tire in the method of this invention is dependent upon the size relationships of the tire and rim and can easily be determined after these dimensions have been selected. Where the ID of the tire is very close to the OD of the rim flange, care must be taken to not excessively evacuate the chamber which would cause the tire opening to be changed to a rather oblong configuration which would increase the forces necessary to pass the roll hoop areas over the flange.

From a study of the drawings and description, it will become evident to one skilled in the art that removal of a tire from the rim is accomplished by reversing the procedure.

By mounting the tire by the process of this invention, the tire is positioned on the rim without subjecting the tire rim wall 12 to possible damage. This process also saves time, labor and the waste of material resulting from tool damaged tires.

The embodiments of the invention in which an exclusive property or privilege is claimed are defined as follows:

1. A method for mounting a closed torous tire on a rim, said tire having a rim wall, a tread wall, opposed side walls, a chamber, an outer surface, a valve assembly extending from an outer surface into communication with the chamber, and a respective roll hoop area generally defining the juncture between each side wall and the rim wall, said rim having a tire seat, comprising:
    withdrawing a volume of fluid from the tire chamber through the valve assembly, said volume of withdrawn fluid being of a magnitude sufficient for reducing the pressure within the chamber to a lower magnitude than atmospheric pressures and moving the opposed roll hoop areas to locations adjacent one another in response to said withdrawing of said volume of fluid;
    thereafter urging the tire onto the rim with the pair of roll hoop areas positioned adjacent the tire seating surface of the rim; and
    passing a volume of fluid through the valve assembly and into the tire chamber, said volume of fluid passing into the chamber being a volume sufficient for inflating the tire to a preselected pressure and seating the tire on the tire seating surface of the rim.

2. A method, as set forth in claim 1, wherein the rim has opposed outer flanges and the tire is positioned on the rim by progressively urging portions of a first roll hoop over a selected rim flange and thereafter progressively urging portions of the second roll hoop over said rim flange.

3. A method, as set forth in claim 2, wherein the roll hoop portions are urged over the selected rim flange by applying forces generally parallel to the axis of the tire.

4. A method, as set forth in claim 1, including moving the rim wall into the tire chamber in response to withdrawing air from the tire chamber.

5. A method for mounting a closed torous tire on a rim, said tire having a rim wall, a tread wall, opposed side walls, a chamber, an outer surface, a valve assembly extending from an outer surface into communication with the chamber, and a respective roll hoop area generally defining the juncture between each side wall and the rim wall, said rim having a tire seat, comprising:
    withdrawing a volume of fluid from the tire chamber through the valve assembly, said volume of withdrawn fluid being of a magnitude sufficient for moving the opposed roll hoop areas to locations adjacent one another in response to said withdrawing a volume of fluid;
    thereafter urging the tire onto the rim with the pair of roll hoop areas positioned adjacent the tire seating surface of the rim;
    passing a volume of fluid through the valve assembly and into the tire chamber, said volume of fluid passing into the chamber being a volume sufficient for inflating the tire to a preselected pressure and seating the tire on the tire seating surface of the rim; and
    wherein the rim is a drop center rim having a rim well, first and second opposed flanges and a pair of annular intermediate flanges, each intermediate flange being angularly oriented relative to the rim well and connecting a respective outer flange to the rim well and including:
    positioning the roll hoops in the rim well; and
    sliding each of the roll hoops over a respective intermediate flange in response to passing fluid into the chamber.

6. A method, as set forth in claim 1, wherein the tire seating surface of the rim has an opening and including positioning the valve assembly adjacent said opening prior to passing fluid into the tire chamber.

7. A method, as set forth in claim 6, including passing a portion of the valve assembly through the opening in response to passing fluid into the tire chamber.

8. A method, as set forth in claim 1, wherein the passing of fluid into the chamber is in first and second stages, said first stage being in response to opening the chamber into communication with the atmosphere and said second stage being in response to forcing fluid into the chamber.

* * * * *